Feb. 28, 1961
R. GLAVAN
2,973,227
METHOD OF MAKING SELF-ALIGNING BEARINGS AND ARTICLES PRODUCED THEREBY
Filed Dec. 6, 1957
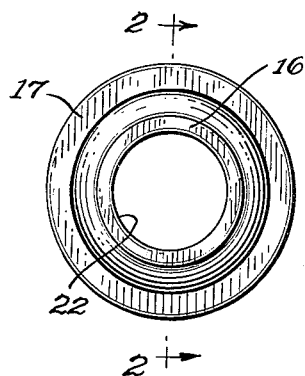
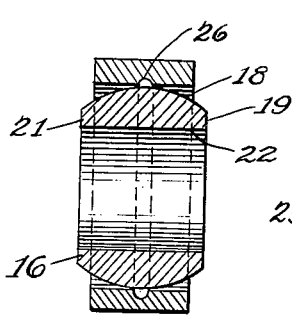
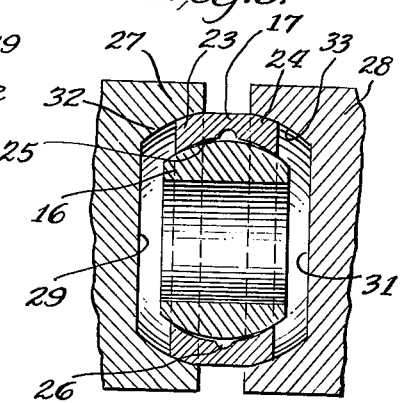
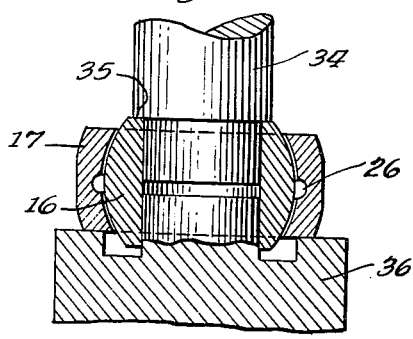
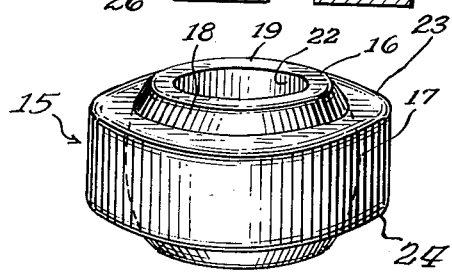
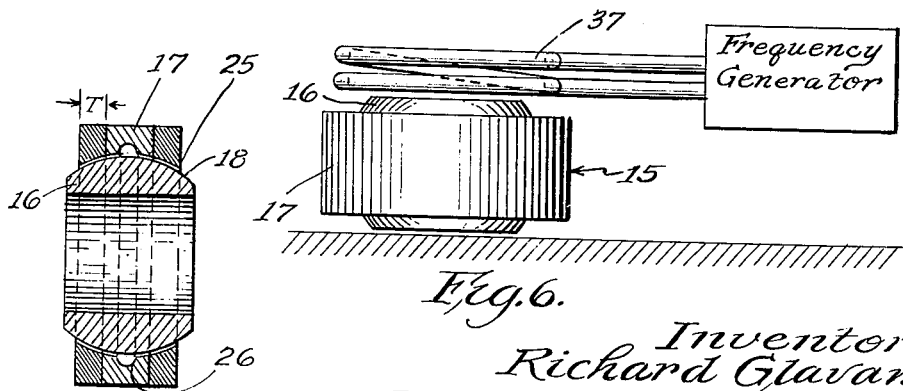
Inventor
Richard Glavan
By Mann, Brown and McWilliams
Attys.

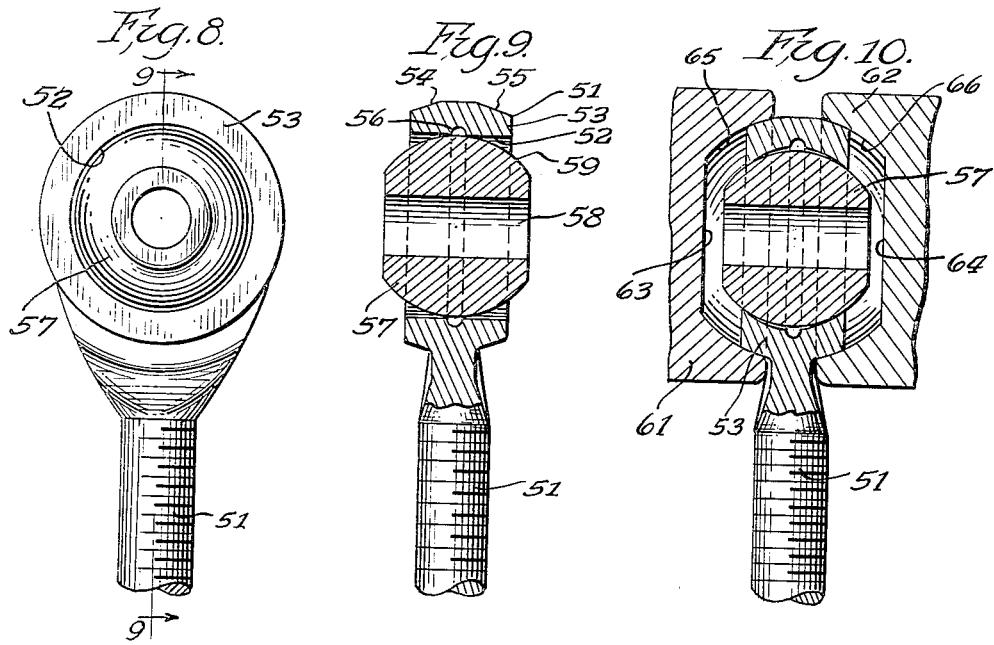

Feb. 28, 1961  R. GLAVAN  2,973,227
METHOD OF MAKING SELF-ALIGNING BEARINGS
AND ARTICLES PRODUCED THEREBY
Filed Dec. 6, 1957  3 Sheets-Sheet 3
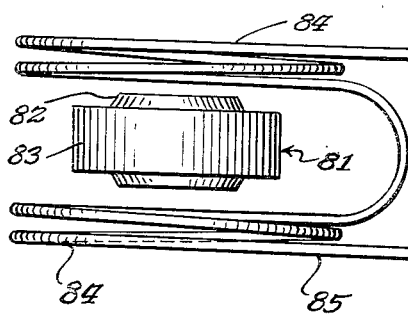
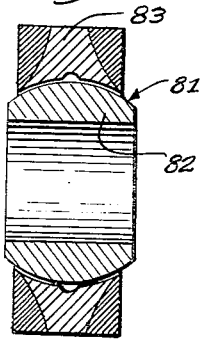
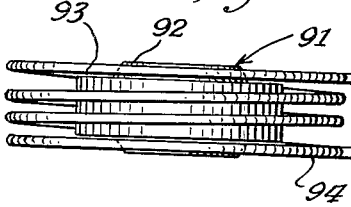
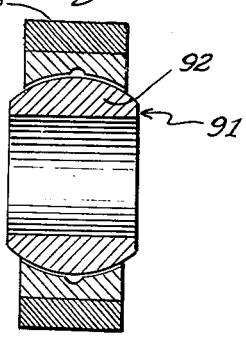
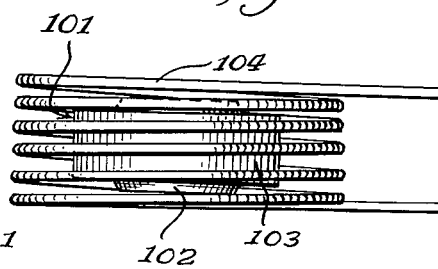
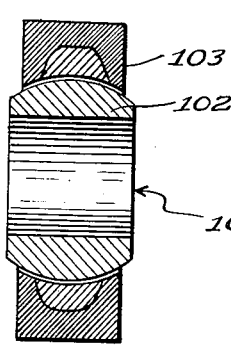
Inventor
Richard Glavan
By Mann, Brown & McWilliams
Attys.

United States Patent Office 2,973,227
Patented Feb. 28, 1961

2,973,227

METHOD OF MAKING SELF-ALIGNING BEARINGS AND ARTICLES PRODUCED THEREBY

Richard Glavan, Joliet, Ill., assignor to Stephens-Adamson Mfg. Co., a corporation of Illinois Filed Dec. 6, 1957, Ser. No. 701,168

8 Claims. (Cl. 308—72)

This invention relates to an improved method of making a self-aligning bearing and the bearings produced by the method disclosed herein.

Self-aligning bearings having a ball locked within an outer race are commonly used under conditions in which varying loads are applied to the bearings. One of the most common type of failures of this type of bearing is one in which the outer race is deformed under the varying load and the ball becomes unduly loose in, or even leaves the outer race.

Numerous attempts have been made to solve the problem of deformation of the outer race, but none of the solutions have been economically and functionally feasible. By using a multi-piece outer race having a hardened material as one part, the outer race is not easily deformed, but the high cost of production renders this solution undesirable. Another attempted solution has been to harden the bearing assembly after formation, but this solution is undesirable from a functional aspect because the entire outer race becomes brittle and subject to failure due to shock, and the process of hardening the entire race often corrodes the outer surface of the ball which renders the bearing useless at the outset.

One of the objects of this invention is to provide a method for making a self-aligning bearing which may withstand a varying load without failure due to deformation of the outer race.

A further object of the instant invention is to provide a self-aligning bearing which has hardened portions symmetrically positioned within a ductile outer race member to prevent deformation of the outer race and prevent cracks from propagating across the entire member.

Another object of this invention is to provide a method of making a self-aligning bearing which is adapted for use in mass production methods.

A further object of this invention is to provide an economical method of making a self-aligning bearing in which the outer race will not easily deform and will retain substantial toughness.

Other objects, uses, and advantages will be obvious or become apparent from a consideration of the following description and the accompanying drawings.

In the drawings:

Figure 1 is a side elevation of a ball positioned within an outer race and showing a preliminary step in the formation of a bearing according to this invention;

Figure 2 is a cross-sectional view taken on line 2—2 of Figure 1;

Figure 3 is a cross-sectional view of the ball and outer race shown in Figure 1 after deformation of the outer race in a die;

Figure 4 is a cross-sectional view of the ball and outer race, showing how the ball may be freed from the race;

Figure 5 is a perspective view of a completed bearing;

Figure 6 is a side elevation of the self-aligning bearing being selectively hardened by induction heating, with the induction coil and a frequency generator being shown schematically;

Figure 7 is a cross-sectional view of a zone hardened bearing with the hardened portion indicated by double cross-hatching;

Figure 8 is a side elevation of a ball positioned within a rod end and showing a preliminary step in the formation of a bearing according to this invention;

Figure 9 is a cross-sectional view taken on line 9—9 of Figure 8;

Figure 10 is a cross-sectional view of the rod end outer race and ball shown in Figure 8 after deformation of the rod end outer race in a die;

Figure 11 is a side elevation of the rod end being selectively hardened by induction heating in an induction coil of a frequency generator shown schematically;

Figure 12 is a perspective view of the completed rod end;

Figure 13 is a cross-sectional view of a zone hardened rod end with the hardened portions indicated by double cross-hatching;

Figure 14 is a side elevation of a self-aligning bearing being selectively hardened by induction heating with the induction coil having a diameter substantially greater than the outside diameter of the bearing and the induction coil and frequency generator being shown schematically;

Figure 15 is a cross-sectional view of a zone hardened bearing which was heated in the arrangement shown in Figure 14 and the hardened portion is indicated by double cross-hatching;

Figure 16 is a side elevation of a self-aligning bearing being selectively hardened by induction heating with the induction coil and frequency generator being shown schematically;

Figure 17 is a cross-sectional view of a zone hardened bearing which was heated in the arrangement indicated in Figure 16 with the hardened portion indicated by double cross-hatching;

Figure 18 is a side elevation of a self-aligning bearing being selectively hardened by induction heating with the induction coil and frequency generator being shown schematically; and Figure 19 is a cross-sectional view of a zone hardened bearing which was heated in the arrangement shown in Figure 18 with the hardened portion indicated by double cross-hatching.

My invention is applicable to, for instance, the self-aligning spherical bearing generally indicated by numeral 15 in Figure 5, which consists of a ball 16 and an outer race 17. As may be seen in Figures 3, 5 and 7, the ball 16 has an outer surface 18 which is defined as a portion of a surface of revolution of a circle, thus, a sphere. The ball 16 has a pair of opposite and substantially parallel ends 19 and 21 with a rod opening 22 extending through the center of the ball and having its longitudinal axis substantially perpendicular to the planes of the end surfaces 19 and 21. The rod aperture 22 thus provides a suitable means to receive a rod or shaft within the ball 16.

The outer race 17 has integral therewith retaining end portions 23 and 24 with a ball receiving aperture 25 extending through the race 17. The ball receiving aperture 25 conforms to the exterior surface 18 of ball 16 so that the ball is free to move within the outer race 17 but is retained therein. An oil groove 26 in the interior surface of the race 17 is an equal distance from the retaining end portions 23 and 24.

Prior to performing the selective hardening process later described, the self-aligning bearing 15 may be fabricated in the following manner. The ball 16 is preferably made on an automatic screw machine from a steel which is capable of being hardened, such as SAE 52100 or 440–C stainless steel. The ball is then hardened by heating and using an appropriate quench after which the ball is ground to a desired finish. The ball is then chrome plated to provide a harder exterior surface 18. The purpose of the chrome plating is to increase the ability of the ball to resist wear and corrosion.

The outer race 17 may be formed from SAE 4130 or 410, or other suitable ductile or malleable materials, and is machined on an automatic screw machine in the form of a ring having a cylindrical aperture extending therethrough. The ball 16 is positioned in outer race 17, as may be seen in Figures 1 and 2. After the ball 16 is positioned in outer race 17, the ball and outer race are placed between a pair of dies 27 and 28 having cavities 29 and 31, respectively. The cavities 29 and 31 have forming surfaces 32 and 33, respectively which are similar to the exterior surface 18 of ball 16. As the dies are forced toward each other, a press forming operation occurs whereby the retaining end portions 23 and 24 that engage surfaces 32 and 33, respectively, are deformed on either side of an equator portion of ball 16 so that the interior surface of race 17 conforms to the exterior surface 18. The dies are released from the bearing 15 and the ball 16 is locked within the outer race 17 so that the ball is not free to move therein.

The ball 16 may be freed within the outer race 17 as by striking a few sharp blows endwise on the ball and from both sides thereof, in the manner indicated in Fig. 4. This may be accomplished in any convenient manner, and in Figure 4 is shown a shouldered pin 34 engaging the end wall 35 of ball 16, with the outer race 17 resting against stationary die 36. One or more sharp blows applied to the end of the pin 34 against one side of ball 16, and after the race is turned over, against the other side thereof, tend to increase the radius of the concave surface of the race by spreading the side thereof so that the ball is free to rotate in its intended manner.

Of course, any other suitable method of establishing the swiveling action of the ball within the race may be used, such as heating the ball and/or cooling the race prior to swaging in the dies 27 and 28.

After loosening of the ball within the outer race the outer race is machined at its ends and along its outer surface to the cylindrical configuration shown in Figure 5.

In accordance with my invention, the bearing is then selectively heat treated. This may be done as follows: The bearing is placed beneath an induction coil 37 having an outside diameter approximately equal to the outside diameter of the outer race, as may be seen in Figure 6. The induction coil in this instance, is a liquid cooled tube having an O.D. of 3/16 inch wound into a two-turn coil having a 1 5/8 inch outside diameter. The coil 37 is connected to a frequency generator which in this instance is a Lindberg Tube set having a rated output of 25 kilowatts at 400 kilocycles, and an output amperage of 1.75 amps. A sheet of electrical insulating non-magnetic material such as mica may be placed between the coil and the bearing to prevent the possibility of the bearing shorting the coil.

The edge of the outer race 17 adjacent the coil is rapidly heated by induction heating to a temperature above the critical temperature of the material while the remainder of the race and the ball is not perceptibly affected. The race is then quenched immediately after heating to produce the hardened zone indicated in Figure 7 by the criss-crossing and having a thickness, generally indicated by "T." The opposite edge of the race 17 is then positioned next to the coil and hardened in the manner described above.

During the induction hardening of the race, the high frequency current flowing through the coil 37 sets up a magnetic flux completely around the coil. The race is positioned with respect to coil 37 in such a manner that the temperature of only those portions of the race shown in criss-crossing in Figure 7 will rise to and above the critical temperature of the material employed, the electromotive force set up in these portions of the race by the magnetic flux causing a current flow which, due to the resistance offered by the material from which the race is made, effects the rise in temperature.

The critical temperature of the material employed, or its $A_c$ point, is the temperature at which complete austenitizing occurs, that is, the temperature at which the crystalline structure ferrite, known as alpha iron (a body centered cubic), changes to a face centered cubic; this is brought about by the carbon atoms dissolving in the solid solution within the ferrite, thus entering the interstices of the austenite atom arrangement, resulting in a substance known as gamma iron.

When the parts are quenched in water or other appropriate quenching media, the consequent rapid cooling of the metal occurs. During cooling, the dissolved carbon is thrown out of solution at an ever increasing rate. It is this great tendency to reject carbon from solid solution on cooling that is the phenomenon underlying the hardening of all hardenable steel; the rejected atoms require finite periods of time and minimum thermal energies to find their new and satisfactory positions of stability. The rapid cooling causes the steel to be distorted atomically and it is this controlled distortion that gives the structure known as martensite.

After the cooling of the heated portions of the race has been completed, I prefer to employ a light stress relieving or temperaing operation, in which the temperature of the unit is raised by employing a conventional tempering method to allow some atom re-arrangement within the basic martensitic structure in the previously hardened areas, this increasing the toughness and ductility of these portions with only a slight loss of hardness. For instance, when SAE 4130 or 410 are employed in forming race 17, a plurality of the units may be heated in a tempering furnace to approximately 350° Fahrenheit for approximately one hour, depending on the thickness and hardness of the race.

The heating procedure and atomic re-arrangement are the same for both SAE 4130 and 410, except that the critical temperatures are different because of the difference in chemistry of the materials, and other well known factors. In practice, the critical temperature of SAE 4130 is 1395 degrees Fahrenheit, and its quenching temperature should be approximately 1550 degrees Fahrenheit, while the critical temperature of SAE 410 is 1450 degrees Fahrenheit, and its quenching temperature should be approximately 1800 degrees Fahrenheit.

Several specific examples will be of interest. In one test, a bearing 15 having an outer race made of SAE 4130 with an outside diameter of 1 5/16 inches and a thickness of 13/32 inch was placed adjacent a coil 37 in the manner indicated in Figure 6. The current was turned on for two seconds and the bearing 15 was quenched immediately after heating. The outer race was cut and a hardened zone, generally indicated by the criss-crossing lines was observed to have a thickness of 1/8 of an inch and a Rockwell hardness 54 to 58 on the "C" scale.

Another example of this method is one in which a similar bearing to the one described above was heated for only one second and quenched immediately after heating. The thickness "T" as shown in Figure 7, was 1/16 of an inch and the hardened zone on one edge had a hardness of 54 to 56 on the Rockwell "C" scale.

Another material, namely SAE 410 (a stainless steel capable of being hardened), when used in the manufacture of the outer race, with the same dimensions as mentioned above, was heated for two seconds and quenched immediately after heating. It was observed that the hardened zone on one edge had a thickness of 1/8 of an inch with a hardness of 42 to 44 Rockwell on the "C" scale.

Though the examples mentioned above only describe the hardening of one side of the outer race 17, in actual production, both sides are hardened so that the outer race will not deform on either side.

In all of the samples, it was noted that the hardened martensitic structure had a fine boundary layer between the transformed and untransformed areas. It appears that the rapid heating of the outer race to the critical temperature completely localizes the transformation of the outer race to the martensitic structure and there is no effect in the body of the race or in the ball. In no case was it observed that the chrome plating of the ball was discolored even though the heating was done in air. Thus, neither the hardness of the ball nor the hardness of chrome plating is affected, nor is there any corrosive effect upon the ball or the chrome plating due to the heat treating of the outer race.

The localized hardening of the outer race provides hard end portions which are not easily deformed by varying loads, so that the fatigue strength is greatly increased. However, there is no appreciable sacrifice of the toughness of the outer race because the central portion of the outer race is not hardened which gives a tough foundation to the hardened portions which renders the entire outer race highly resistant to shock.

The selective hardening process is applicable to other types of bearings, for instance, the two-piece rod end shown in Figure 13. In making the rod end prior to heat treatment, a rod end blank 51 may be formed by a conventional machine operation of a suitable material such as SAE 4130 or 410 steel. The rod end blank 51 has an outer race 53 at one end and a ball receiving aperture 52 extending therethrough. An oil groove 56 is provided in the interior surface of outer race 53 defining aperture 52 as a path for a lubricant.

A ball 57 may be made by the same method of manufacture as ball 16 described above, from a suitable material, such as SAE 52100 steel or a 440-C stainless steel. The ball 57 has a shaft hole 58 in the central portion thereof and an outer surface 59 which is a portion of a sphere.

The ball 57 outside diameter is slightly less than the diameter of bearing aperture 52 in rod end blank 53, and is positioned in the rod end blank 51 in the manner shown in Figures 8 and 9. The rod end blank 51 with the ball 57 positioned therein is placed between dies 61 and 62 which have die cavities 63 and 64, respectively. The die cavities 63 and 64 contain annular curved side walls 65 and 66, respectively. The walls 65 and 66 of the dies engage the race ends 54 and 55, respectively and a force is applied to the dies to deform the outer race 53 so that the inner portion of the outer race is press formed into conformity with the outer surface 59 of the ball 57.

After the outer race is formed about the ball 57, the ball is locked within the outer race and not free to move therein. The outer race may be loosened from the ball by, for instance, striking the ball as described above, or any other convenient method, such as heating the ball and cooling the race.

In applying the selective hardening concept to the rod end, it is then placed, for instance, between coil portions 68 of coil 69 attached to a frequency generator of the type described above. Between coil portions 68 and rod end 67, mica sheets 71 are illustrated; the mica sheets prevent the rod end from establishing a direct electrical contact with the coil portions 68 but allow the magnetic flux to pass to the outer race 53. The outer race 53 is heated in the same manner as that described for bearing 15 and quenched in an appropriate manner for the particular material involved; the unit may also be subjected to stress relieving operation outlined above.

The hardened portion of the rod end, after the heating and quenching, may be seen in Figure 13. The race ends 54 and 55 are in a hardened state. The material adjacent to the ends 54 and 55 is tough so that the rod end may withstand substantial shock, but under a repetitive load the rod end will not easily fail. The ball 57 is not adversely affected by the heating, because the rate of heating is sufficiently rapid, and the quenching thereafter so quickly done, that the temperature of the ball does not build up dangerously.

The method described above is particularly adaptable to mass production processes since there is no close machining required in the assembly of the bearings. After the parts have been made, the hardening step may be done by unskilled labor and in a semi-automatic fashion. It is only essential that the heating be quite rapid to localize the high temperature and the quenching be done immediately after the heating so that the heated portions do no cool below the critical temperature and the heat may not penetrate the other portions of the bearing.

Although a preferred embodiment of this invention produces a hardened zone as shown in Figures 7 and 13, the position and cross section of the hardened zone may be varied by varying the relation of the size of the coil to the size of the outside race and the positioning of the bearing with relation to the coil. As an example, a spherical bearing 81, shown in Figures 14 and 15, has a ball 82 which is similar to ball 16 described above, and an outer race 83 which is similar to outer race 17 also described above. The bearing 81 is fabricated in the same manner that bearing 15 is fabricated. After the bearing 81 is completed, it is placed, for instance, between coil portions 84 of coil 85, said coil portions having a diameter substantially greater than the outside diameter of the outer race 83 and are connected to a frequency generator of the type mentioned above. The outer race 83 is heated by induction heating and quenched immediately after heating. The hardened zone achieved in outer race 83 is indicated by the double cross-hatching in Figure 15. As may be clearly seen from the figure, the zone is not of uniform thickness, but is thicker on the outside than on the inside.

Another type of hardened zone may be achieved in a spherical bearing 91 shown in Figures 16 and 17 which has a ball 92 and an outer race 93 which are similar to ball 16 and outer race 17, respectively, of bearing 15. The bearing 91 is also fabricated in the same manner that bearing 15 is fabricated and the bearing 91 is placed inside a coil 94 which does not have any of its turns extend beyond the outer race 93. The coil 94 is also connected to a frequency generator and the outer race 93 is heated by induction heating and quenched immediately after heating. The hardened zone which is developed by the heat treating just described, is shown as the double cross-hatch section in Figure 17. The hardened zone extends only along the outer portion of the outer race 93.

A hardened zone having another cross-section may be developed by the arrangement shown in Figure 18. A bearing 101 which may be seen in Figures 18 and 19, has a ball 102 and an outer race 103. The ball 102 and race 103 are similar to the ball 16 and the outer race 17 of bearing 15. Bearing 101 is fabricated in a manner in which bearing 15 is fabricated. After fabrication, the bearing 101 is positioned in the center of coil 104 which has turns extending beyond the width of the race 103. The coil 104 is connected to a frequency generator and the outer race 103 is rapidly heated and quenched immediately after heating. The resulting hardened zone in outer race 103 is one in which all but the center of the outer race 103 is hardened as may be seen in Figure 19.

In all of the examples given, it should be noted that the ball member, prior to its assembly in the outer race or rod end socket, has already been heat-treated or otherwise provided with its desired hardness, but the outer race, whether in the form of a separate member or a rod end, is selectively hardened after the assembly is made. There are a number of advantages that flow from this procedure. In the first place, the outer race, or rod member, may be made of a suitable ductile material, such as SAE 4130 so that it may readily be swaged over the ball member to form the spherical seat for the ball. Thereafter, the selective hardening of the ball seat has the effect of providing the required hardness for resisting thrust loads or other loads which would tend to loosen the ball within its socket or permit it to be disengaged from the socket but at the same time retaining a ductile or tough core, or portion, which resists shock loads, and prevents cracks which could form in the hardened area from extending completely across the bearing seat, resulting in a complete fracture of such seat. In other words, as long as there is a portion of the outer race or bearing seat which, throughout its circumference, is of sufficient area to give the outer race the quality of toughness, the hardening of the other portions or areas of the race may serve the useful function of resisting deformation of the race or bearing seat under loads. Any crack which forms in the hardened portion of the race or seat cannot extend throughout the entire race or seat, and thus cause fracture.

The hardening treatment herein disclosed is applicable to other types of bearings or bearing units, such an antifriction bearing units of the pillow block or flange type that employ cast or forged housings. The elements selectively heat treated may be formed from any hardenable steel or perlitic malleable iron.

While I have shown and described particular embodiments of my invention, it will occur to those skilled in the art that variations, changes and modifications may be made without departing from my invention and I therefore aim in the appended claims to cover all such changes and modifications as fall within the true spirit and scope of my invention.

I claim:

1. A method of making a self-aligning bearing assembly comprising positioning a ball in an outer race, forming the outer race against the ball on either side of an equator portion of the latter to secure the ball within the race, heating a portion of one edge of the outer race of the assembly above the critical temperature of the material from which the outer race is formed without substantially heating the remainder of the outer race or the ball, quenching the outer race to harden the heated portion without materially affecting the remainder of the outer race or the ball, heating a portion of the other end of the outer race without substantially heating the remainder of the race or the ball, and quenching the outer race to harden the heated portion without substantially affecting the remainder of the race or the ball.

2. A self-aligning bearing comprising an outer race having a ball retaining aperture extending therethrough, with a portion of the inner surface of the race defined as a portion of a sphere, said outer race consisting of a ductile hardenable metallic material having a hardened circumferential portion at each end thereof to retain the configuration of said ends, said portions each having a cross section with a narrow section proximate the inner surface and an enlarged section proximate the outer surface of said outer race, said outer race also including a ductile core portion located intermediate said hardened end portions to give an overall race the quality of toughness, and a hardened metallic ball rotatably retained within the ball retaining aperture of said outer race, the ball having an outer surface defining a portion of a sphere similar to the inner surface of the outer race.

3. A self-aligning bearing comprising an annular outer race having a ball retaining aperture extending therethrough with an inner surface defined as a portion of a sphere, said race consisting of a ductile hardenable metallic material having a ductile core portion to give the race the quality of toughness and a circumferential hardened portion adjacent the entire outer surface of said outer race, and a hardened metallic ball rotatably retained within said race.

4. A self-aligning bearing comprising a hardened metallic ball having a portion of its outer surface defined as a portion of a sphere, and an annular outer race consisting of a ductile hardenable metallic material with a ball aperture extending therethrough having an inner surface defined as a portion of a sphere similar to the outer surface of the ball retaining the ball therein, said outer race having a circumferential hardened portion adjacent the ends thereof, a circumferential hardened portion adjacent the entire outer surface of said outer race, and a ductile core portion to give the race the quality of toughness.

5. The method of making a self-aligning bearing unit which includes the steps of positioning a bearing member having a spherically contoured outer surface within a cylindrical housing member, deforming said cylindrical housing member about said bearing member on either side of an equator portion of the latter to secure said bearing member within said housing member and to provide the inner surface of said housing member with a spherical contour that is complementary to said outer surface of said bearing member, rapidly heating the ends of said housing member of the thus assembled unit above the critical temperature of the material from which said housing member is formed while maintaining the remainder of said housing member and said bearing member at a temperature that is substantially below said critical temperature, and then immediately quenching said housing member to form hardened zones about the ends thereof.

6. The method set forth in claim 5 wherein, after the quenching step, said ends of said housing member are again heated to a relatively low stress relieving temperature and maintained at that temperature for an extended period of time.

7. A method of making a self aligning bearing unit which includes taking a race member formed from a malleable material and a hardened bearing member having a spherically contoured external surface, swaging the race member on either side of an equator portion of the bearing member to secure the bearing member within the race member, heating the ends of the race member above the critical temperature of the material from which the race member is formed while maintaining the remainder of the race member and the bearing member at temperatures substantially below said critical temperature, and after the respective race member ends are heated to said critical temperature, quenching the unit to harden only said ends of said race member.

8. The method of making a self-aligning bearing unit which includes taking a hardened bearing member having a spherically contoured external surface, swaging a race member formed of malleable material around the bearing member to thereby provide a spherical bearing seat for said bearing member and secure the bearing member within the race member, heating selected portions of said race member including end portions thereof above the critical temperature of the material of which the race member is formed while maintaining at least the inner equator portion of said outer race member at temperatures substantially below said critical temperature, and then quenching the unit to harden that portion of the outer race member which has been heated above said critical temperature while retaining said inner equator of the outer race in more ductile condition.

References Cited in the file of this patent

UNITED STATES PATENTS

| | | |
|---|---|---|
| 2,259,324 | Robinson | Oct. 14, 1954 |
| 2,733,086 | Latzen | Jan. 31, 1956 |
| 2,787,048 | Heim | Apr. 2, 1957 |

OTHER REFERENCES

Metal Progress, published by American Society for Metals, August 15, 1955; pages 121–123 relied upon.